United States Patent
Uchida (10) Patent No.: US 12,294,911 B2
(45) Date of Patent: May 6, 2025

(54) COMMUNICATION METHOD AND COMMUNICATION DEVICE

(71) Applicant: Seiko Epson Corporation, Tokyo (JP)

(72) Inventor: Shuji Uchida, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 480 days.

(21) Appl. No.: 17/699,235

(22) Filed: Mar. 21, 2022

(65) Prior Publication Data

US 2022/0303726 A1    Sep. 22, 2022

(30) Foreign Application Priority Data

Mar. 22, 2021   (JP) ................................ 2021-046974

(51) Int. Cl.
  *H04W 4/029*   (2018.01)

(52) U.S. Cl.
  CPC .................... *H04W 4/029* (2018.02)

(58) Field of Classification Search
  CPC ................... H04W 4/02; Y02D 30/70
  See application file for complete search history.

(56) References Cited

U.S. PATENT DOCUMENTS

| | | | |
|---|---|---|---|
| 7,453,355 B2 | 11/2008 | Bergstrom et al. | |
| 2010/0082288 A1* | 4/2010 | Cattin .................. | G01C 22/006 702/150 |
| 2014/0153491 A1* | 6/2014 | Lee ....................... | H02J 50/402 307/104 |
| 2014/0269755 A1* | 9/2014 | Veiga .................. | H04L 47/2416 370/429 |
| 2015/0181171 A1* | 6/2015 | Park ....................... | G06V 20/52 348/143 |
| 2016/0337812 A1* | 11/2016 | Nakagawa ............... | H04W 4/30 |
| 2018/0270604 A1* | 9/2018 | Yanagi .................... | G01S 19/48 |
| 2020/0187107 A1* | 6/2020 | Ogawa .................. | H04W 48/18 |
| 2021/0377695 A1* | 12/2021 | Montón Sánchez .. | H04W 4/029 |

FOREIGN PATENT DOCUMENTS

| | | |
|---|---|---|
| JP | 2005-535981 A | 11/2005 |
| JP | 2019-021967 A | 2/2019 |
| JP | 2020-136985 A | 8/2020 |
| WO | 2020-170485 A1 | 8/2020 |

\* cited by examiner

*Primary Examiner* — Fabricio R Murillo Garcia
(74) *Attorney, Agent, or Firm* — Harness, Dickey & Pierce, P.L.C.

(57) ABSTRACT

A communication device is a communication device that transmits detection information including position information based on an LPWA communication system, and includes a position information acquisition unit that acquires the position information based on a positioning signal, a storage unit that stores the detection information, a first communication unit that performs LPWA-compliant wireless communication, a movement detection unit that detects movement of the communication device, and a control unit that controls a communication speed of the wireless communication by the first communication unit, in which the control unit determines whether the communication device is outdoors or indoors based on the positioning signal received by the position information acquisition unit, and when the communication device is determined to be outdoors and the movement detection unit detects movement of the communication device, the control unit changes the communication speed.

5 Claims, 6 Drawing Sheets

COMMUNICATION METHOD AND COMMUNICATION DEVICE

The present application is based on, and claims priority from JP Application Serial Number 2021-046974, filed Mar. 22, 2021, the disclosure of which is hereby incorporated by reference herein in its entirety.

BACKGROUND

1. Technical Field

The present disclosure relates to a communication device using a low power wide area (LPWA) communication system and a communication method using the communication device.

2. Related Art

For example, JP 2020-136985 A discloses a communication device capable of transmitting position information based on an LPWA communication system. The communication device is a terminal device for the Internet of Things (IoT), and includes a position information acquisition unit that acquires position information, a movement determination unit that determines whether the communication device has moved after acquiring the position information, and a transmission control unit that controls transmission of the position information based on a determination result by the movement determination unit. Then, the position information transmitted by the terminal device is received by the receiving side device.

However, JP 2020-136985 A does not consider a reception success rate of position information while the terminal device is moving. In the document, the position information is retransmitted when the movement of the terminal device is detected after the position information is transmitted. However, when the terminal device continues to move, it is difficult for the receiving side device to receive the position information because the terminal device is still moving at the time of retransmission. In particular, when the terminal device is indoors, the reception success rate tends to be even lower because the building weakens the transmission signal.

SUMMARY

A communication device according to the present application is a communication device configured to transmit detection information including position information based on an LPWA communication system, and includes a position information acquisition unit configured to acquire the position information based on a positioning signal, a storage unit configured to store the detection information, a first communication unit configured to perform LPWA-compliant wireless communication, a movement detection unit configured to detect movement of the communication device, and a control unit configured to control a communication speed of the wireless communication by the first communication unit, in which the control unit determines whether the communication device is outdoors or indoors based on the positioning signal received by the position information acquisition unit, and when the communication device is determined to be outdoors and the movement detection unit detects movement of the communication device, the control unit changes the communication speed.

A communication method according to the present application is a communication method for transmitting detection information including position information of a communication device based on an LPWA communication system, and includes acquiring the position information based on a positioning signal, storing the detection information, detecting movement of the communication device, determining whether the communication device is outdoors or indoors based on the positioning signal, and when the communication device is determined to be outdoors and movement of the communication device is detected, changing a communication speed.

DESCRIPTION OF EXEMPLARY EMBODIMENTS

Embodiments

Overview of Position Detection System

Figure 1:
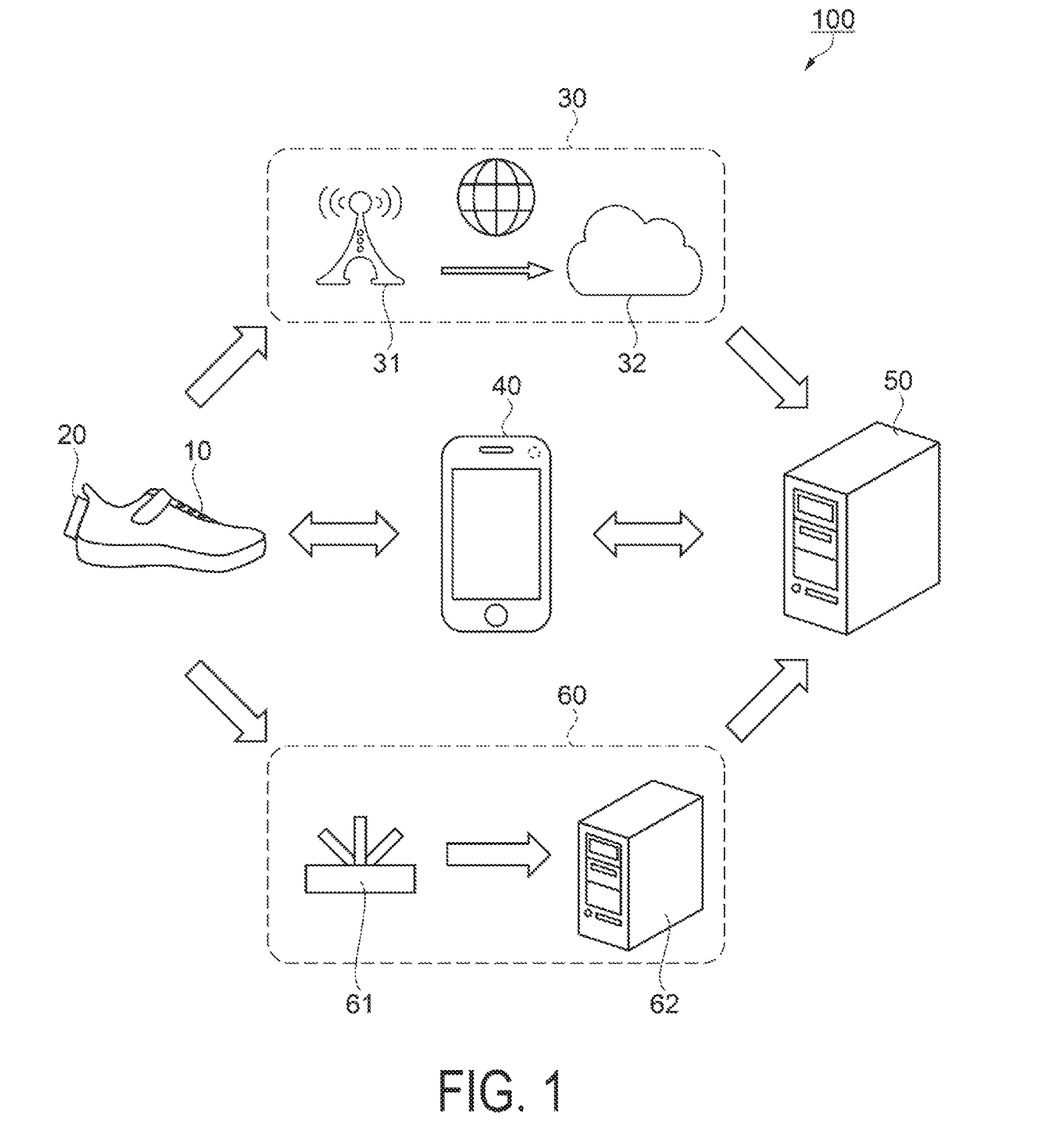
FIG. 1 is a schematic diagram of a position detection system according to an embodiment.

FIG. 1 is a schematic diagram of a position detection system according to an embodiment.

A position detection system 100 of the embodiment is a position detection system that detects a position of a terminal device 20 worn by a target person by using a low power wide area (LPWA) communication system. The target person can be a child, an elderly person who needs to be watched over, or the like. In a preferred example, as illustrated in FIG. 1, the terminal device 20 is attached to a heel of a shoe 10 worn by the target person. Note that the terminal device 20 only needs to be attached directly or indirectly to the target person, and may, for example, be in the form of a wristwatch or attached to a school bag.

As illustrated in FIG. 1, the position detection system 100 includes the terminal device 20 as a communication device, an LPWA network 30, an information communication device 40, a facility monitoring system 60, a server 50, and the like.

In a preferred example, the Sigfox (registered trademark) network is used as the LPWA network 30. Sigfox is a power-saving wide-area communication standard specialized for the Internet of Things (IoT). Data transmitted from the terminal device 20 including a Sigfox-compliant communication module is received at a base station 31 and stored in the Sigfox cloud 32 via the Internet. The server 50 is provided so as to be able to acquire the data from the Sigfox cloud 32. Note that the network is not limited to Sigfox, but any LPWA network can be used. For example, LoRa (registered trademark), Wi-Fi (registered trademark), HaLow (registered trademark), Wi-SUN (registered trademark), RPMA (registered trademark), Flexnet (registered trademark), and NB-IoT may be used.

The information communication device 40 is, for example, a smartphone and includes a Bluetooth (registered trademark) Low Energy (BLE) communication module. In a preferred example, the information communication device 40 is assumed to be a smartphone carried by a guardian of a person to be watched. For example, when the target person is a child, the information communication device 40 is carried by a child's parent, and when the child is near, the information communication device 40 can perform wireless communication with the terminal device 20 worn by the child via BLE. The owner of the information communication device 40 is not limited to relatives, but may be a person related to the person to be watched. The information communication device 40 also includes a communication module for a mobile communication system using a wireless telephone line and a wireless LAN module.

The facility monitoring system 60 is a monitoring system using BLE communication introduced in a commercial facility such as a shopping center, an amusement facility, or the like, and is constituted of a receiver 61, a facility server 62, and the like. The receiver 61 is a BLE beacon receiver, and a plurality of receivers 61 are installed in the facility. The facility server 62 is a host server of the monitoring system, manages detection information transmitted from the plurality of receivers 61, and performs necessary processing. The facility server 62 is provided so as to be able to communicate with the server 50 via the Internet, and transmits the detection information collected in the facility to the server 50.

The server 50 is a host server of the position detection system 100, and manages position information of the terminal device 20 and performs the necessary processing, such as transmitting the position information of the terminal device 20 received via the LPWA network 30 to the information communication device 40.

Configuration of Terminal Device

Figure 2:
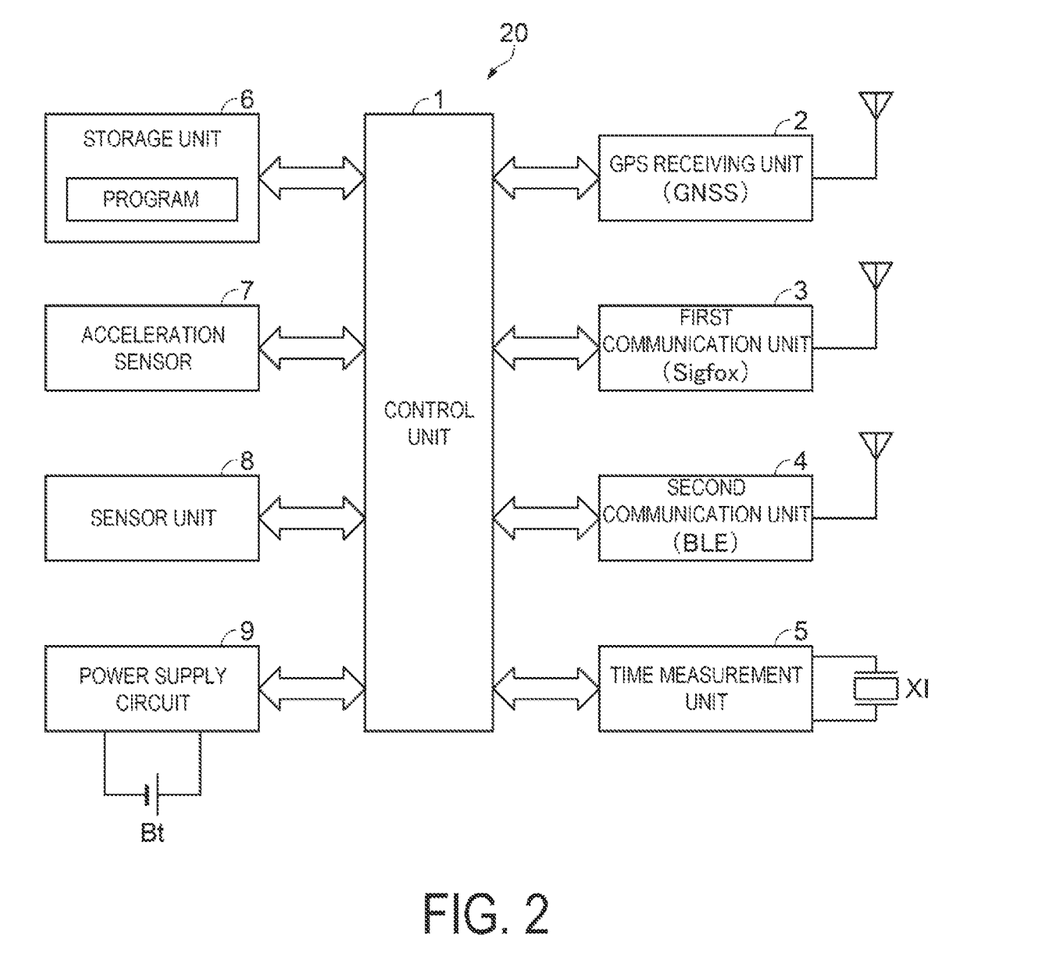
FIG. 2 is a functional block diagram of a terminal device.

FIG. 2 is a functional block diagram of the terminal device.

Next, a configuration of the terminal device 20 will be described.

The terminal device 20 includes a control unit 1, a GPS receiving unit 2, a first communication unit 3, a second communication unit 4, a time measurement unit 5, a storage unit 6, an acceleration sensor 7, a sensor unit 8, a power supply circuit 9, and the like.

The control unit 1 is configured to include a processor, and operates according to a program stored in the storage unit 6 to collectively control the operation of the terminal device 20.

The GPS receiving unit 2 is a position information acquisition unit, receives radio waves from a plurality of GPS satellites, performs positioning using the radio waves, and outputs position information based on a positioning result.

The first communication unit 3 uses a Sigfox-compliant communication module as a preferred example.

The second communication unit 4 is a BLE communication module that performs BLE-compliant wireless communication.

The time measurement unit 5 is a real-time clock provided with a crystal oscillator XI, and continues to measure the time even when the control unit 1 is off, and supplies time data to the control unit 1.

The storage unit 6 includes a read only memory (ROM) and a random access memory (RAM), and stores programs to be executed by the control unit 1, related data, and the like. The programs are an operation mode switching program, a position tracking program, a power saving mode program, and the like, which will be described later.

The acceleration sensor 7 is a movement detection unit, and in a preferred example, a three-axis (X-axis, Y-axis, and Z-axis) acceleration sensor is used. The acceleration sensor 7 detects the acceleration due to the movement of the terminal device 20, and outputs a detection signal to the control unit 1. The movement detection unit may be a gyro sensor, an IMU, or the like instead of the acceleration sensor.

The sensor unit 8 includes a temperature sensor and a pressure sensor, detects the temperature and altitude around the terminal device 20, and outputs a detection signal to the control unit 1. Any sensor capable of detecting environmental information around the terminal device 20 may be used, for example, an optical sensor may be further provided.

The power supply circuit 9 is a power supply circuit powered by a battery Bt, and supplies an operating voltage to the respective units of the terminal device 20. Further, the power supply circuit 9 detects the voltage of the battery Bt and outputs the detected voltage to the control unit 1 as power supply voltage data. The battery Bt is, for example, a rechargeable battery such as a lithium ion battery, and is provided so as to be rechargeable. When the power supply circuit 9 is being charged, a flag indicating that the battery is being charged is set.

Switching of Operation Mode

Figure 3:
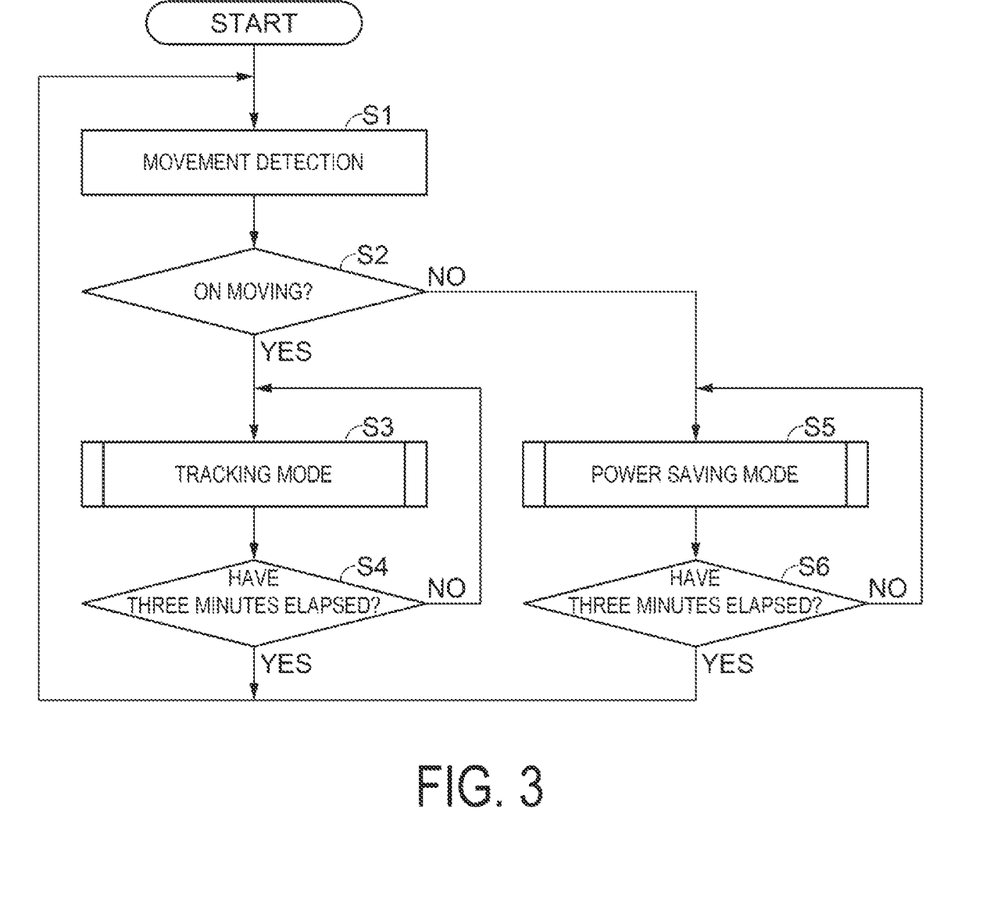
FIG. 3 is a flowchart illustrating switching of an operation mode of the terminal device.

FIG. 3 is a flowchart illustrating switching of an operation mode of the terminal device.

Next, the operation mode of the terminal device will be described, referring mainly to FIG. 3, but also to FIG. 2.

The terminal device 20 has two modes of operation, a tracking mode for detecting the position of the terminal device 20 and a power saving mode. By switching between these modes according to the movement status of the terminal device 20, the terminal device 20 can be driven for a long time by the battery Bt.

The following processing related to the switching of the operation mode of the terminal device 20 is executed by the control unit 1 controlling the respective units according to the operation mode switching program in the storage unit 6.

In step S1, movement detection is performed by the acceleration sensor 7. Note that the detection signal is temporarily stored in the storage unit 6.

In step S2, it is determined from the detection signal detected by the acceleration sensor 7 whether the terminal device 20 is moving. If it is determined that the terminal device 20 is moving, the process proceeds to step S3. If it is determined that the terminal device 20 is not moving, the process proceeds to step S5.

In step S3, the operation mode is set to the tracking mode, and the processing in the tracking mode, including the positioning detection described later, is executed.

In step S4, based on the time data of the time measurement unit 5, it is determined whether a predetermined time has elapsed in the tracking mode. For example, if the predetermined time is three minutes, and three minutes have elapsed, the process returns to step S1. If it is less than three minutes, the process returns to step S3 to continue the processing in the tracking mode.

In step S5, the operation mode is set to the power saving mode, and the processing in the power saving mode described later is executed.

In step S6, based on the time data of the time measurement unit 5, it is determined whether three minutes have elapsed in the power saving mode. If three minutes have elapsed, the process returns to step S1. If it is less than three minutes, the process returns to step S5 to continue the processing in the power saving mode.

Flow of Processing in Tracking Mode

Figure 4:
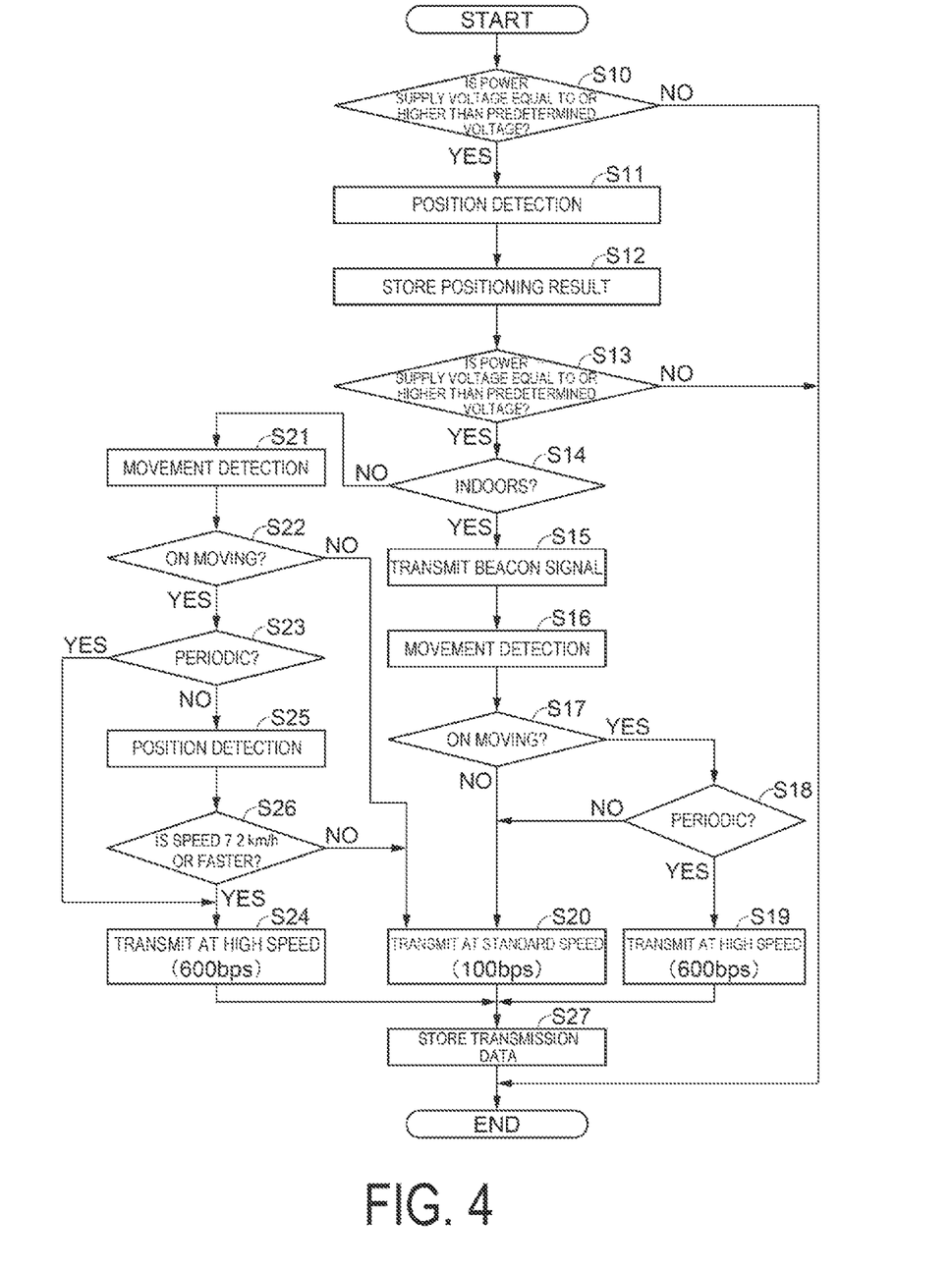
FIG. 4 is a flowchart illustrating a flow of processing in a tracking mode.

FIG. 4 is a flowchart illustrating a flow of processing in the tracking mode.

Next, the flow of processing in the tracking mode will be described, referring mainly to FIG. 4, but also to FIG. 2. The following processing is executed by the control unit 1 as a main operation unit controlling the respective units according to the position tracking program in the storage unit 6. The processing includes a communication method using the terminal device 20.

In step S10, based on the power supply voltage data from the power supply circuit 9, it is determined whether the power supply voltage is equal to or higher than a predetermined voltage required for operation. If the voltage is equal to or higher than the predetermined voltage, the process proceeds to step S11. If the voltage is lower than the predetermined voltage, the power is turned off and the operation of the terminal device 20 is terminated.

In step S11, the GPS receiving unit 2 receives positioning signals from a plurality of GPS satellites and acquires position information. At this time, the number of GPS satellites that were able to receive the positioning signals with valid radio wave strength is also acquired.

In step S12, the positioning data acquired in step S11, including the position information, the number of GPS satellites, and the acquisition time, is stored in the storage unit 6.

In step S13, based on the power supply voltage data from the power supply circuit 9, it is determined whether the power supply voltage is equal to or higher than the predetermined voltage required for operation. If the voltage is equal to or higher than the predetermined voltage, the process proceeds to step S14. If the voltage is lower than the predetermined voltage, the power is turned off and the operation of the terminal device 20 is terminated. Note that step S13 may be omitted.

In step S14, based on the strength of the positioning signal received by the GPS receiving unit 2, it is determined whether the terminal device 20 is outdoors or indoors. As an example, if the number of GPS satellites that were able to receive the positioning signals with valid radio wave strength is three or less, it is determined that the terminal device 20 is indoors, and if the number is four or more, it is determined that the terminal device 20 is outdoors. A threshold for determining whether the terminal device 20 is outdoors or indoors is not limited to this example. For example, other indicators that can distinguish between outdoor and indoor locations may also be applied, such as comparing the signal strength from each of the plurality of GPS satellites that were able to receive the positioning signals with a threshold.

In step S15, since it is determined that the terminal device 20 is indoors, the second communication unit 4 transmits a beacon signal with the terminal information of the terminal device 20. The terminal information includes identifier (ID) information, which is an identification number of the terminal device 20, and the power supply voltage.

Here, when the receiver 61 (FIG. 1) of the facility monitoring system 60 is within the reception range of the beacon signal from the terminal device 20, the receiver 61 receives the beacon signal and analyzes the terminal information from the received signal. The receiver 61 acquires the ID and the power supply voltage of the terminal device 20 from the analyzed terminal information, and transmits this acquired information, plus the received time and the received radio wave strength (RSSI) information, to the facility server 62 as detection information. After storing the detection information, the facility server 62 transmits the detection information to the server 50 (FIG. 1) of the position detection system 100.

In step S16, movement detection is performed by the acceleration sensor 7. Note that the detection signal is temporarily stored in the storage unit 6.

In step S17, the detection signal acquired in step S16 is analyzed to determine whether the terminal device 20 is moving. If it is determined that the terminal device 20 is moving, the process proceeds to step S18. If it is determined that the terminal device 20 is not moving, the process proceeds to step S20.

In step S18, the detection signal acquired in step S16 is analyzed to determine whether a periodic component is contained. If a periodic component is contained, the process proceeds to step S19. If no periodic component is contained, the process proceeds to step S20.

Figure 5:
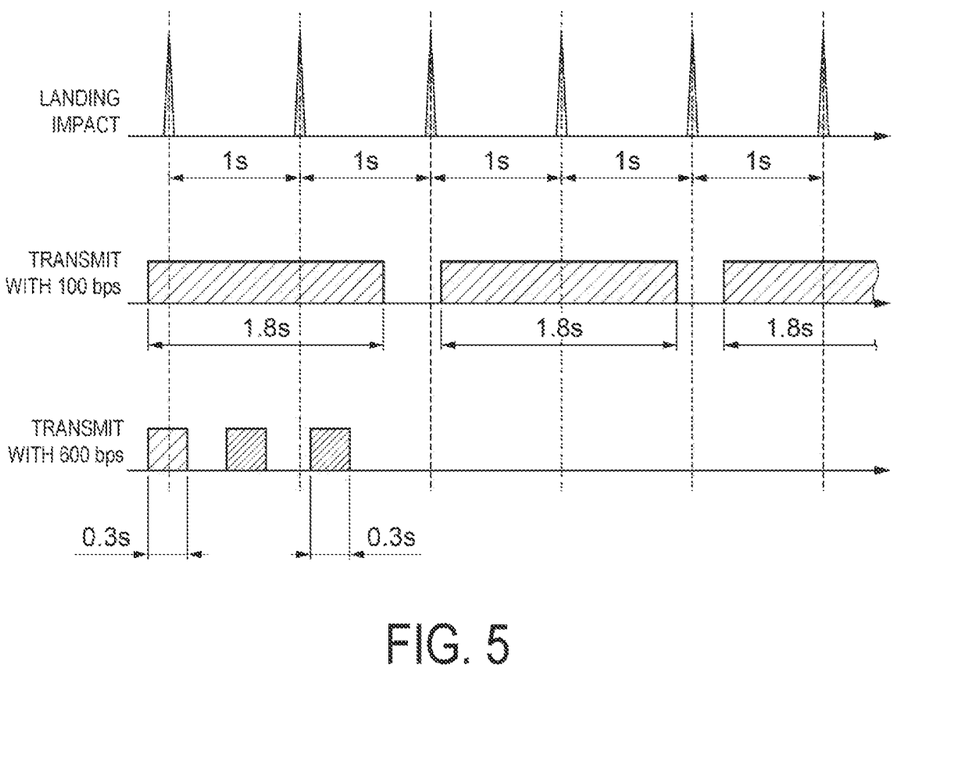
FIG. 5 is a timing chart illustrating a relationship between a transmission signal from the terminal device and a landing impact due to movement.

FIG. 5 is a timing chart illustrating a relationship between a transmission signal from the terminal device 20 and a landing impact due to movement. Here, the relationship between the Sigfox transmission signal transmitted from the terminal device 20 and the landing impact due to the movement will be described.

FIG. 5 illustrates the time required for transmitting the positioning signal from the terminal device 20 with time (sec) on the horizontal axis. As illustrated in FIG. 5, when transmitting a signal at 100 bits per second (bps), which is a standard speed of Sigfox, it takes approximately 1.8 seconds to transmit one frame. Here, when the target person wearing the terminal device 20 is moving on foot, as illustrated in FIG. 5, it can be understood that the landing impact due to walking occurs at intervals of approximately one second, and that this landing impact overlaps the transmission period of 100 bps. In other words, when moving by walking, the periodic component due to the landing impact appears in the detection signal. According to the results of experiments conducted by the inventors, when a landing impact occurs during the transmission period of a transmission signal, the reception success rate at the Sigfox base station 31 becomes low. It is considered that the acceleration due to the landing impact affects the transmission signal.

When transmitting positioning signals from the terminal device 20 in Sigfox, signals with different frequencies from each other are transmitted three times. However, when the transmission rate is 100 bps, as illustrated in FIG. 5, the landing impact occurs during all three transmission periods, resulting in a low reception success rate at the base station 31.

In contrast, when the transmission rate of the transmission signal is set to a high speed of 600 bps, it is possible to transmit one frame at approximately 0.3 seconds. Therefore, as illustrated in FIG. 5, even when the transmission period overlaps with the landing impact for one of the three times, the reception success rate at the base station 31 can be increased because the transmission period does not overlap with the landing impact for the remaining two times. Note that the communication speed is not limited to 600 bps, but may be any communication speed that does not overlap or does not frequently overlap with the landing impact.

Returning to FIG. 4, the description will be continued.

In step S19, the positioning data stored in step S12 and the detection information including the ID information of the terminal device 20 are transmitted by the first communication unit 3 at a high speed of 600 bps.

In step S20, the positioning data stored in step S12 and the detection information including the ID information of the terminal device 20 are transmitted by the first communication unit 3 at a standard speed of 100 bps. In other words, in steps S14 to S17, when it is determined that the terminal device 20 is indoors and movement of the terminal device 20 is detected, the control unit 1 changes the communication speed.

Next, the processing when it is determined that the terminal device 20 is outdoors in step S14 will be described.

In step S21, movement detection is performed by the acceleration sensor 7. Note that the detection signal is temporarily stored in the storage unit 6.

In step S22, the detection signal acquired in step S21 is analyzed to determine whether the terminal device 20 is moving. If it is determined that the terminal device 20 is moving, the process proceeds to step S23. If it is determined that the terminal device 20 is not moving, the process proceeds to step S20.

In step S23, the detection signal acquired in step S21 is analyzed to determine whether a periodic component is contained. If a periodic component is contained, the process proceeds to step S24. If no periodic component is contained, the process proceeds to step S25.

In step S25, the GPS receiving unit 2 acquires position information. Note that the position information and the acquisition time are temporarily stored in the storage unit 6.

In step S26, it is determined whether the moving speed of the terminal device 20 is 7.2 km/h (a predetermined speed) or faster. In detail, the moving distance is derived from the position information acquired in step S11 and the position information acquired in step S25, and the movement speed of the terminal device 20 is calculated by dividing the derived moving distance by the difference between the acquisition times of the two position information. In step S26, whether the target person is moving by a means of transportation that does not generate a landing impact, such as a bicycle, is determined by using the speed of 7.2 km/h, which corresponds to a fast walk, as a threshold. If the moving speed is 7.2 km/h or faster, the process proceeds to step S24. If the moving speed is slower than 7.2 km/h, the process proceeds to step S20. Note that the predetermined speed as the threshold is not limited to 7.2 km/h.

In step S24, the positioning data stored in step S12 and the detection information including the ID information of the terminal device are transmitted by the first communication unit 3 at a high speed of 600 bps.

In step S27, the detection information including the positioning data transmitted in step S19, step S20, or step S24, and the transmission time are stored in the storage unit 6. Note that the detection information and the transmission time stored here correspond to the last transmission data, and are stored until the next update.

In addition to the positioning data, the detection information may also include environmental information and power supply voltage. For example, when the position information is detected in step S11, the sensor unit 8 detects the temperature and altitude in parallel, and the detected data is stored in the storage unit 6 as environmental information in step S12. The power supply voltage acquired in step S10 or step S13 is also stored in the storage unit 6.

Then, in step S19, step S20, or step S24, the detection information including the positioning data, the environmental information, and the power supply voltage may be transmitted.

Flow of Processing in Power Saving Mode

Figure 6:
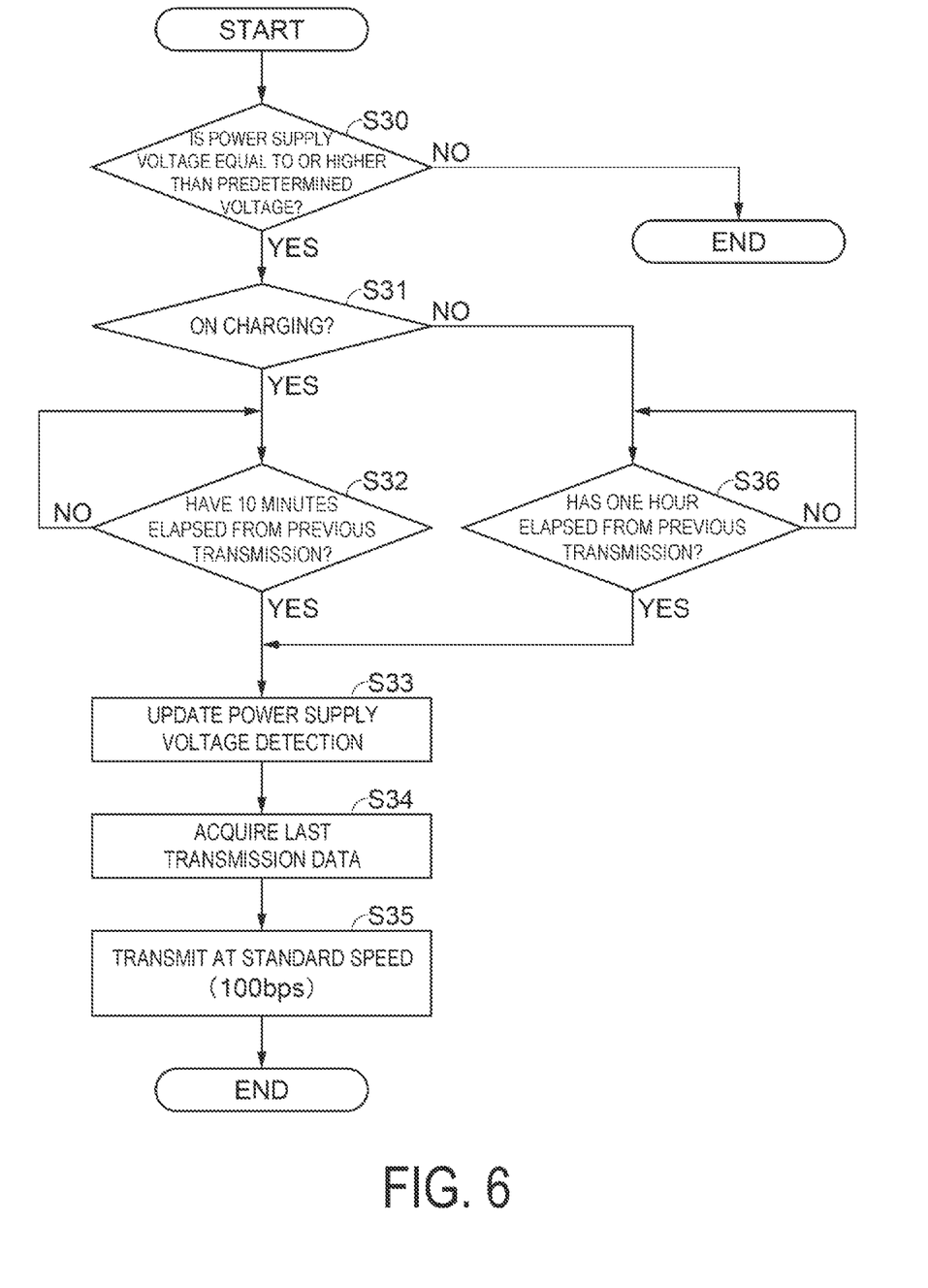
FIG. 6 is a flowchart illustrating a flow of processing in a power saving mode.

FIG. 6 is a flowchart illustrating a flow of processing in the power saving mode.

Next, the flow of processing in the power saving mode will be described, referring mainly to FIG. 6, but also to FIG. 2. The following processing is executed by the control unit 1 as a main operation unit controlling the respective units according to the power saving mode program in the storage unit 6.

In step S30, based on the power supply voltage data from the power supply circuit 9, it is determined whether the power supply voltage is equal to or higher than a predetermined voltage required for operation. If the voltage is equal to or higher than the predetermined voltage, the process proceeds to step S31. If the voltage is lower than the predetermined voltage, the power is turned off and the operation of the terminal device 20 is terminated.

In step S31, a flag indicating a charging state of the power supply circuit 9 is checked to determine whether charging is in progress. If charging is in progress, the process proceeds to step S32. If charging is not in progress, the process proceeds to step S36.

In step S32, based on the current time data from the time measurement unit 5 and the transmission time of the last transmission data in the storage unit 6, it is checked whether 10 minutes have elapsed since the last transmission of the transmission signal containing the positioning data in the tracking mode. If 10 minutes have elapsed, the process proceeds to step S33. If 10 minutes have not elapsed, the process returns to step S32.

In step S33, the power supply voltage is detected by the power supply circuit 9 and the power supply voltage of the last transmission data stored in the storage unit 6 is updated. During charging, the power supply voltage fluctuates greatly, so it is necessary to update the voltage information to the latest one.

In step S34, the last transmission data including the positioning data is acquired from the storage unit 6.

In step S35, the transmission signal containing the positioning data acquired in step S34 is transmitted by the first communication unit 3 at a standard speed of 100 bps.

In step S36, based on the current time from the time measurement unit 5 and the transmission time of the last transmission data in the storage unit 6, it is checked whether one hour has elapsed since the last transmission of the transmission signal containing the positioning data in the tracking mode. If one hour has elapsed, the process proceeds to step S34. If one hour has not elapsed, the process returns to step S36.

As described above, in the power saving mode, position detection and movement detection, which consume a large amount of power, are not performed, and when a predetermined time has elapsed since the last transmission, the last detection information is again transmitted, thereby indicating that the target person stays in the same position. In other words, when the state in which the movement of the terminal device 20 is not detected by the acceleration sensor 7 continues, the terminal device 20 again transmits the last detection information after a predetermined time has elapsed since the transmission of the last detection information.

Communication Method with Smartphone

Returning to FIG. 1, the description will be continued. The information communication device 40 has an application installed for checking the position of the terminal device 20 and performing wireless communication with the terminal device 20. When the application is activated, in a case in which the terminal device 20 is within the communication range of BLE, an icon of the terminal device 20 is displayed on a screen of the information communication device 40. When the icon is selected, a command for requesting detection information is transmitted from the information communication device 40 to the terminal device 20 via BLE wireless communication. The terminal device 20 that receives the request command then transmits the detection information to the information communication device 40 via BLE. As a result, a guardian carrying the information communication device 40 can understand and manage the state of the terminal device 20. For example, in a preferred example, since the detection information includes the power supply voltage, the guardian can charge the terminal device 20 when charging is necessary.

In addition, when the guardian in a remote location outside the BLE communication range wants to check the position of the terminal device 20, the guardian can acquire the position information of the terminal device 20 from the server 50 via a wireless telephone line or wireless LAN by operating a position detection button on the operation screen of the application. For example, the position of the terminal device 20 is identifiable in a map displayed on the screen of the information communication device 40. When the position information from the server 50 is position information transmitted from the facility monitoring system 60, the corresponding facility in the map is identified and displayed, and a position comment is appended. The position comment is a comment telling that the person to be watched is near the receiver 61 that received the nearest BLE beacon signal to the person to be watched, such as "near the entrance of a sporting goods store on the first floor".

As described above, according to the terminal device 20 and the communication method using the terminal device 20 of the embodiment, the following effects can be obtained.

The terminal device 20 as a communication device includes the GPS receiving unit 2 configured to acquire position information based on the positioning signal, the storage unit 6 configured to store the detection information, the first communication unit 3 configured to perform LPWA-compliant wireless communication, the acceleration sensor 7 configured to detect movement of the terminal device 20, and the control unit 1 configured to control a communication speed of the wireless communication by the first communication unit 3, in which the control unit 1 determines whether the terminal device 20 is outdoors or indoors based on the strength of the positioning signal received by the GPS receiving unit 2, and when the terminal device 20 is determined to be outdoors and the acceleration sensor 7 detects movement of the terminal device 20, the control unit 1 changes the communication speed.

For example, when the person to be watched wearing the terminal device 20 is moving on foot, the shock wave due to the walking may affect the transmission of the detection information and reduce the reception success rate. Further, the Sigfox base station 31 does not return a reception response even when the Sigfox base station 31 receives a signal from the terminal device 20, so that the success or failure of reception is not known by the terminal device 20, and highly accurate transmission is required.

According to the terminal device 20, when it is determined that the terminal device 20 is outdoors and it is detected that the terminal device 20 is moving, the transmission can be completed in the gap of the shock waves by increasing the communication speed, so that the reception success rate at the receiving side device can be improved. Accordingly, it is possible to provide the terminal device 20 capable of reliably transmitting position information even when the terminal device 20 is outdoors and is moving.

The terminal device 20 further includes the second communication unit 4 configured to perform BLE-compliant wireless communication, and when the terminal device 20 is determined to be indoors, the control unit 1 transmits the beacon signal containing the detection information from the second communication unit 4.

When the terminal device 20 is indoors, the transmission signal is weakened by the building, so that the reception success rate at the base station 31 of the LPWA network 30 tends to decrease. However, by providing the second communication unit 4 in the terminal device 20, it is possible to transmit the position information of the terminal device 20 to the server 50 using the facility monitoring system 60 by transmitting a BLE beacon signal from the second communication unit 4. When the person to be watched is in the facility where the facility monitoring system 60 is installed, the beacon signal from the terminal device 20 is received by the nearest receiver 61. The receiver 61 analyzes the received signal to acquire the terminal information, and extracts the ID and the power supply voltage of the terminal device 20 from the terminal information. The receiver 61 then transmits the detection information obtained by adding the reception time and the received radio wave strength (RSSI) information to the facility server 62. After storing the detection information, the facility server 62 transmits the detection information, in which the position of the terminal device 20 is in the vicinity of the receiver 61 that received the beacon signal, to the server 50 of the position detection system 100.

Thus, even when the communication by the first communication unit 3 fails, the position information of the terminal device 20 can be acquired via the facility monitoring system 60 by using the second communication unit 4. In other words, by having two communication routes for transmission, the reception success rate of the detection information including the position information of the terminal device 20 at the server 50 can be increased.

Accordingly, it is possible to provide the terminal device 20 capable of reliably transmitting position information even when the terminal device 20 is indoors and is moving.

When the detection signal, in which the movement of the terminal device 20 is detected by the acceleration sensor 7, contains a periodic component, the control unit 1 increases the communication speed.

When the detection signal contains the periodic component, it is presumed that the person to be watched is walking. Thus, when the periodic component is contained, the influence of the landing impact on the transmission signal can be reduced by increasing the communication speed. Accordingly, the reception success rate at the base station 31 can be increased.

The detection information transmitted from the terminal device 20 includes the position information and the power supply voltage or the environmental information.

Thus, it is possible to inform the guardian carrying the information communication device 40 of the temperature and altitude of the environment where the person to be watched is located. Further, when the power supply voltage requires charging, the guardian can charge the terminal device 20.

When the movement of the terminal device 20 is not detected by the acceleration sensor 7, the control unit 1, after the predetermined time from the last transmission of the detection information, causes the first communication unit 3 to re-transmit the last detection information.

Thus, it is possible to inform the guardian carrying the information communication device 40 that the person to be watched stays at the same position.

The communication method by the terminal device 20 is a communication method for transmitting the detection information including the position information of the terminal device 20 based on the LPWA communication system, and includes acquiring the position information based on the positioning signal by the GPS receiving unit 2, storing the detection information by the storage unit 6, detecting the movement of the terminal device 20 by the acceleration sensor 7, determining whether the terminal device 20 is outdoors or indoors based on the strength of the positioning signal, and when the terminal device 20 is determined to be indoors and the movement of the terminal device 20 is detected, changing the communication speed by the first communication unit 3.

According to this communication method, when it is determined that the terminal device 20 is indoors and it is detected that the terminal device 20 is moving, the transmission can be completed in the gap of shock waves by increasing the communication speed, so that the reception success rate at the receiving side device can be improved. Accordingly, it is possible to provide the communication method for the terminal device 20 capable of reliably transmitting position information even when the terminal device 20 is indoors and is moving.

What is claimed is:

1. A communication device configured to transmit detection information including position information based on a low power wide area (LPWA) communication system, the communication device comprising:
    a position information acquisition unit configured to acquire the position information based on a positioning signal;
    a storage unit configured to store the detection information;
    a first communication unit configured to perform LPWA-compliant wireless communication;
    a movement detection unit configured to detect a movement signal relating to movement of the communication device while the communication device is carried by a user; and
    a control unit configured to control a communication speed of the wireless communication by the first communication unit, wherein
    the control unit determines whether the communication device is outdoors or indoors based on the positioning signal received by the position information acquisition unit,
    when the communication device is determined to be outdoors and the movement detection unit detects the movement of the communication device, the control unit transmits the detection information from the first communication unit,
    the control unit determines whether a plurality of impact signals included in the movement signal are periodic,
    the plurality of impact signals correspond to landing impacts of a foot of the user due to walking of the user, and
    when the plurality of the impact signals included in the movement signal are periodic, the control unit controls the communication speed of the wireless communication by the first communication unit to a first speed that is faster than an interval of the plurality of the impact signals included in the movement signal.

2. The communication device according to claim 1 further comprising:
    a second communication unit configured to perform BLE-compliant wireless communication, wherein
    when the communication device is determined to be indoors, the control unit transmits the detection information from the second communication unit.

3. The communication device according to claim 1, wherein
    the detection information includes the position information and power supply voltage or environmental information.

4. The communication device according to claim 1, wherein
    when the movement of the communication device is not detected by the movement detection unit, the control unit, after a predetermined time from last transmission of the detection information, re-transmits the last transmitted detection information.

5. A communication method for transmitting detection information including position information of a communication device based on a low power wide area (LPWA) communication system, the communication method comprising:
    acquiring the position information based on a positioning signal;
    storing the detection information;
    detecting a movement signal relating to movement of the communication device while the communication device is carried by a user;
    determining whether the communication device is outdoors or indoors based on the positioning signal;
    transmitting the detection information when the communication device is determined to be outdoors and the movement of the communication device is detected;
    determining whether a plurality of impact signals included in the movement signal are periodic; and
    controlling a communication speed of a wireless communication to a first speed that is faster than an interval of the plurality of impact signals included in the movement signal when the plurality of impact signals included in the movement signal are periodic,
    wherein the plurality of impact signals correspond to landing impacts of a foot of the user due to walking of the user.

* * * * *